July 17, 1956     F. S. JOCHUMSEN     2,755,098
VEHICULAR BODY SUSPENSION
Filed Sept. 10 1952
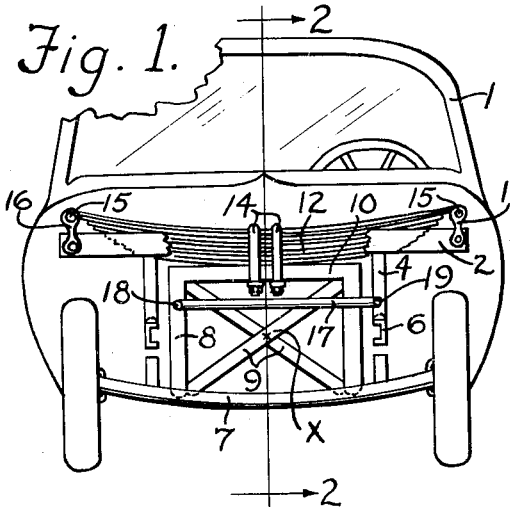
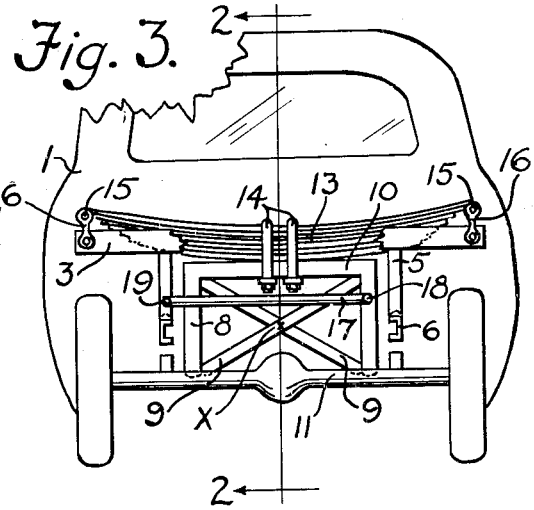
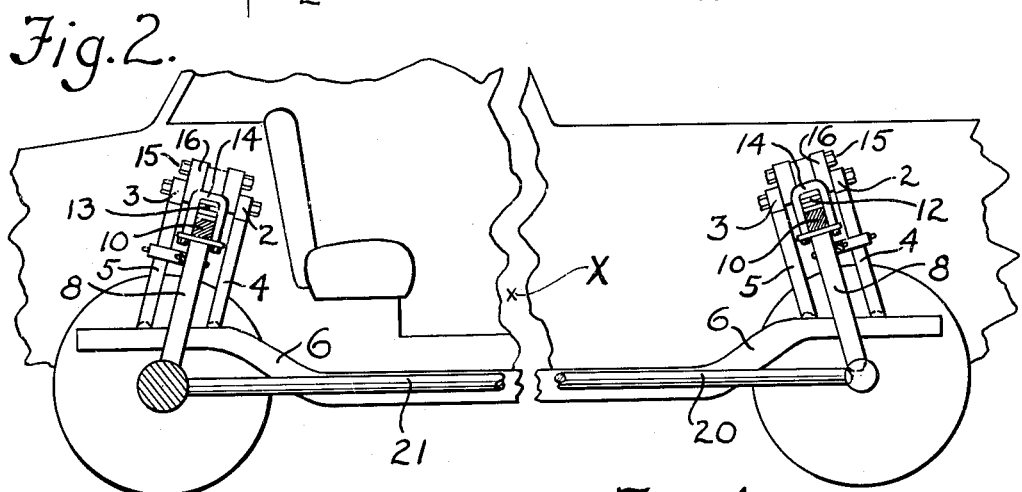
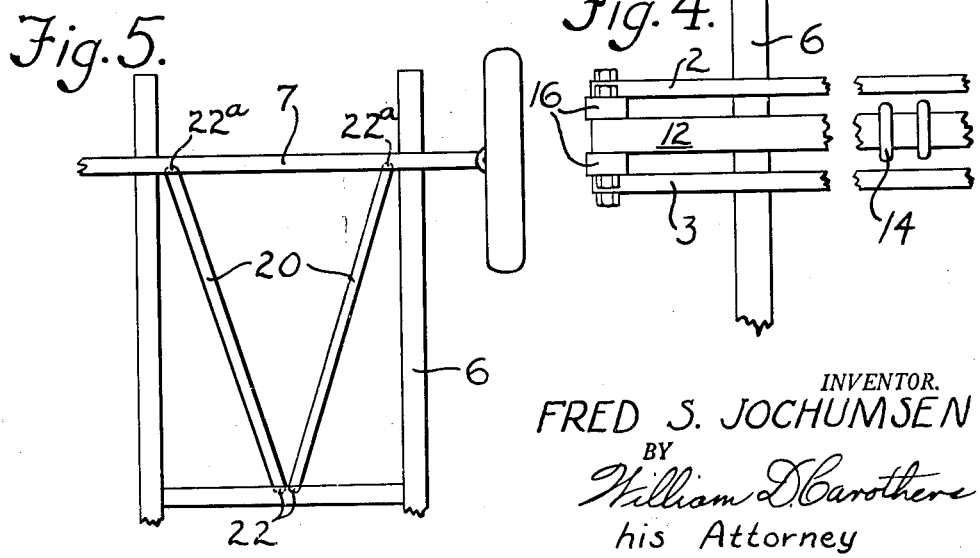
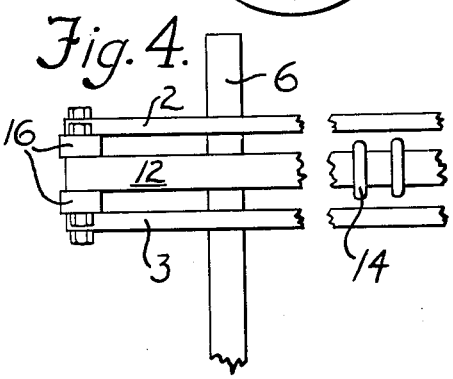
INVENTOR.
FRED S. JOCHUMSEN
BY
William D. Carothers
his Attorney

United States Patent Office 2,755,098
Patented July 17, 1956

2,755,098

VEHICULAR BODY SUSPENSION

Fred S. Jochumsen, Pittsburgh, Pa.

Application September 10, 1952, Serial No. 308,735

4 Claims. (Cl. 280—106.5)

This invention relates generally to the suspension of automobile chasses on their axles, and more particularly to a vehicular body suspension that shifts the body to a banked position as the vehicle rounds a corner through the flexing of its spring supporting means.

Different lever and linkage structures have been suggested for supporting the body on its axles to permit the body to bank toward the center of the curve around which the vehicle is traveling. These structures rely upon the shifting of the linkage levers supporting the body which induces a material amount of wear on the pivoted joints connecting these linkage systems. In such systems, the linkage actually determines the pitch or banked position of the body, and the springs merely adjust themselves to the newly acquired position of the body, but do not themselves function as the determining factor of the pitch angle that the body assumes. Such lever linkage systems accentuate the banking movement of the body.

The principal object of this invention is the provision of a suspension system for vehicular bodies wherein the springs themselves function to determine the pitch of the bank that the body assumes when the vehicle is rounding a corner and a single linkage connection is provided merely as a guide to prevent the parts of the body frame and wheel support members from striking one another as the body tilts or shifts.

This invention contemplates the use of a leaf spring or a coil spring support. The leaf spring may be transverse of the automobile, in which case, only two springs may be employed, and these fore and aft springs are large. Longitudinally disposed individual leaf springs may be employed at each corner of the car body, or for each wheel. These are smaller leaf springs. The automobile may be provided with a coil spring suspension and still follow the teachings of this invention. The suspension may be a combination of a coil spring and a leaf spring.

Regardless of the type of springs employed, the link connecting the body and wheel supporting members guide the movement of the body on the springs and the springs themselves must flex and the shackles permit the body to bank. Radius rods and similar stabilizing rods are employed to maintain the proper alignment of the wheel supporting member, as well as the body. The spring suspension members may be located fore or aft of the axles as well as directly above the same.

Other objects and advantages will be apparent from the following description and claims.

The accompanying drawings show for the purpose of exemplification, without limiting the invention or claims thereto, certain practical embodiments of the invention wherein:

Fig. 1 is a view in front elevation showing the front suspension of an automobile.

Fig. 2 is a view in side elevation showing the front and rear suspension of an automobile.

Fig. 3 is a view in elevation showing the rear suspension of an automobile.

Fig. 4 is a plan view of the suspension member.

Fig. 5 is a view of the under side of the suspension member.

Referring to Figs. 1 to 5 of the drawings, the car body and chassis is illustrated at 1, and is provided in front with a pair of parallel frame members 2 and 3. The outer box frame members 2 and 3 are provided with downwardly extending posts 4 and 5, that are secured at the lower ends to the chassis channel 6. As shown in Fig. 1, the front axle 7 is provided with an upwardly projecting inner box frame 8 braced by the cross members 9, and having an upper bridging member 10 that is disposed crosswise, transversely of the vehicle. The same character of frame is supported from the rear axle 11. Intermediate of the transversed bridging member 10, the leaf springs 12 and 13 are supported with the center portion of the spring being secured by the U-bolts 14 to the bridge members 10. Each of the leaf springs 12 and 13 is shown to be a full length spring, having the outer ends terminating in the shackle joint member 15, which has pivotally connected thereto the shackle members 16, the lower end of which is pivotally connected to the ends of the transverse bars 2 and 3. Thus, the fore and aft springs 12 and 13 support the whole of the chassis of the vehicle from the front and rear axles 7 and 11 respectively. The frame member 8 has pivotally secured thereto, one end of the link 17, as indicated at 18, the other end of which is pivoted to the chassis, as indicated at 19. This single link permits the chassis to have limited relative movement to the frame 8, and permits the same to bank in either direction, or move vertically depending upon the road conditions over which the vehicle is traveling.

Each of the front and rear axles 7 and 11 is connected by the radius rods 20 and 21, for the purpose of maintaining alignment of the front and rear axles relative to the chassis of the vehicle, and these radius rods are provided with ball and socket connections, such as indicated at 22, where they are secured to the mid-point of the chassis as indicated in Fig. 5. The other ends of these radius rods are solidly bolted to the axle as shown at 22a.

By supporting the springs 12 and 13 above the center gravity of the vehicle, which center gravity is approximately at X, as shown in Fig. 1, this spring suspension allows the body to shift relative to the wheel supports, or axles, and permits the same to bank or lean towards the inside of the curve around which the vehicle is traversing. Such motion placed on the vehicle is, of course, due to the fact that the spring suspension is above the center of gravity of the vehicular body, and that the momentum is moving the body in this manner, owing to the inertia which is determined of course by the speed in which the vehicle is traversing the curve. If the spring suspension is at the center of gravity, or below the center of gravity, this effect will not be obtained.

It is preferable that the radius rods 20 be connected to the vehicle at the elevation at or about the center of the machine and at or about the center of gravity. In this way, the body may swing and bank without materially affecting the position of the front and rear axles. The ball and socket joints which connect these radius rods to the axles and the body, permit this action to take place.

I claim:

1. A motor vehicle comprising a body having a chassis, front and back wheel supporting members, a front and back transverse outer box frame mounted on said chassis, a transverse inner box frame mounted on each wheel supporting member and telescoped into their respective outer box members, the upper portion of both the inner and outer box frames being above the weight center of the vehicle, spring assembly means extending transversely of the chassis and having its center portion attached to the top of one box frame and its ends attached to the top of the other box frame to suspend said body from above the weight center of the vehicle, and to flex and bank the same toward the center of a curve as the vehicle rounds the same.

2. The structure of claim 1 which also includes guiding means between the inner and outer telescoping box frames to guide them in their telescopic movement.

3. The structure of claim 1 which also includes a link pivotally secured at its ends to the inner and outer telescoping box frames to aid in guiding the movement of the banking body as the spring means flexes and the inner and outer box frames telescope within one another.

4. The structure of claim 1 characterized in that the front and back inner and outer box frame members are mounted to slope toward each other.

References Cited in the file of this patent

UNITED STATES PATENTS

| | | |
|---|---|---|
| 1,153,602 | Chapin | Sept. 14, 1915 |
| 2,529,162 | Kier | Nov. 7, 1950 |

FOREIGN PATENTS

| | | |
|---|---|---|
| 402,798 | Great Britain | May 6, 1932 |
| 689,203 | France | May 26, 1930 |